United States Patent [19]
Travers et al.

[11] Patent Number: 5,682,172
[45] Date of Patent: Oct. 28, 1997

[54] HEADSET FOR PRESENTING VIDEO AND AUDIO SIGNALS TO A WEARER

[75] Inventors: Paul J. Travers, Rochester; Robert E. Taylor, Fairport, both of N.Y.

[73] Assignee: Forte Technologies, Inc., Rochester, N.Y.

[21] Appl. No.: 366,967

[22] Filed: Dec. 30, 1994

[51] Int. Cl.⁶ .................................................. G02B 27/02
[52] U.S. Cl. .......................... 345/8; 348/42; 348/53; 359/477; 359/630
[58] Field of Search .............................. 2/2, 15, 11, 414, 2/415, 421, 424, 425; 345/8; 348/42, 51, 53, 61, 115, 164; 359/13, 466, 471, 477, 481, 630, 631; D14/124, 205; 381/25, 183, 187, 188, 189; 351/123, 158; 379/430; 352/57; 128/661.01, 916; 434/43, 44; 600/109, 111

[56] References Cited

U.S. PATENT DOCUMENTS

| | | | |
|---|---|---|---|
| D. 369,595 | 5/1996 | Kober et al. | D14/124 |
| 2,955,156 | 10/1960 | Heilig | 348/53 |
| 2,966,550 | 12/1960 | Golberg et al. | 381/90 |
| 3,050,870 | 8/1962 | Heilig | 434/365 |
| 3,261,028 | 7/1966 | Coletta | 2/209 |
| 3,614,314 | 10/1971 | Rossire | 348/115 |
| 3,923,370 | 12/1975 | Mostrom | 359/630 |
| 3,969,583 | 7/1976 | Griese et al. | 381/26 |
| 4,208,098 | 6/1980 | Johnson | 359/467 |
| 4,310,849 | 1/1982 | Glass | 348/53 |
| 4,342,560 | 8/1982 | Ledvina et al. | 474/157 |
| 4,395,731 | 7/1983 | Schoolman | 348/53 |
| 4,574,197 | 3/1986 | Kliever | 250/334 |
| 4,666,638 | 5/1987 | Baker et al. | 261/26 |
| 4,817,633 | 4/1989 | McStravick et al. | 2/15 X |
| 4,952,024 | 8/1990 | Gale | 350/143 |
| 5,373,857 | 12/1994 | Travers et al. | 128/782 |

FOREIGN PATENT DOCUMENTS 2113058  7/1983  United Kingdom.

*Primary Examiner*—Raymond J. Bayerl
*Assistant Examiner*—Seth D. Vail
*Attorney, Agent, or Firm*—Cumpston & Shaw

[57] ABSTRACT

A headset for operably disposing speakers and a visual display on the head of a wearer. The headset includes a beam extending over the vertex of the head for contacting the brow at one end and cooperating with a nape strap on the posterior end for adjusting the fit. Rigid arms extend from the posterior end adjacent the head to terminate in the vicinity of the ears. The arms include compressible compensators to substantially accommodate any size head therein. A visor is pivotally connected to the support beam adjacent the brow piece. The attachment of the visor to the support beam permits the visor to be disposed in a donning position away from the face or an operable position adjacent the face, without requiring a weight bearing surface on the face.

16 Claims, 4 Drawing Sheets

HEADSET FOR PRESENTING VIDEO AND AUDIO SIGNALS TO A WEARER

FIELD OF THE INVENTION

The present invention relates to headsets, and more particularly, to a headset for noncircumferentially contacting the head to operably suspend a visual display in front of the eyes, and locate speakers adjacent the ears, wherein the headset is sufficiently coupled to the head to readily transmit rotational torque from the head to the headset on three mutually perpendicular axes.

BACKGROUND OF THE INVENTION

While the software creating virtual reality has continued to improve, there still exists a need for physically presenting a visual display and audio signals to the user. Such a device is shown in U.S. Pat. No. 4,952,024 which disclosures center rib headset. Alternative, devices have employed a helmet which includes a mounted visor which reflects projected light to present a display to the wearer. Headsets have also employed a headband assembly having a headband with an adjustable clasp for adjusting the circumference of the headband to accommodate various head sizes as shown in U.S. Pat. No. 4,395,731. Although the prior devices suitably locate the visual display and audio signals in the appropriate locations, during extended wearing time the headsets may generate substantial discomfort on the weight bearing surfaces on the user.

In addition, virtual reality technology includes motion sensors which detect motion of a headset. Headsets must accurately track the movements of the wearer. This tracking requires a coupling of the headset to the head. Prior mechanisms to couple the headset to the head have included circumferential engagement with the head or fully enclosing helmets. The circumferential engagement constricts the head and induces discomfort, and full helmets are relatively heavy and retain excessive heat.

Therefore, the need exists for a light weight headset which operably presents a visual display and audio signal to a wearer without inducing painful pressure points during extended periods of use. The need exists for a headset which can effectively couple with the head without requiring substantial enclosure of the head. The need further exists for a headset which can translate a slue rate of the head to the headset without significant lag or delay.

SUMMARY OF THE INVENTION

The headset of the present invention includes a curved support beam which extends substantially over the vertex of the head from an anterior end to a posterior end. The anterior end includes a brow piece for contacting the brow of the wearer. The posterior end terminates at the back of the head, above the junction of the neck and head. An arm extends forward from the posterior end to extend along each side of the head to terminate adjacent the ear. Each arm includes a speaker and a compensator cushion. The compensators offer sufficient resiliency to transmit torque from the head to the headset. A nape strap extends across the rear of the headset to dispose a portion of the back of the head between the posterior end of the beam and the strap. The strap permits adjustment of the distance between the strap and the brow piece, thereby accommodating various size heads.

A visual display is pivotally attached to the beam above the brow piece to be movable between an operable position in front of the eyes and a donning position spaced apart from the eyes. A visor may house the visual display and is therefore movable between the donning and the operable position.

The present construction permits the noncircumferential engagement of the head to operably suspend the visual display with respect to the eyes. That is, there is no weight bearing contact between the nose and the cheeks and the visual display, the visor or even the headset.

The present configuration accommodates various head sizes by the cooperation of the brow piece and the nape strap in connection with the compensators on the arms.

DETAILED DESCRIPTION OF THE PREFERRED EMBODIMENTS

Figure 1:
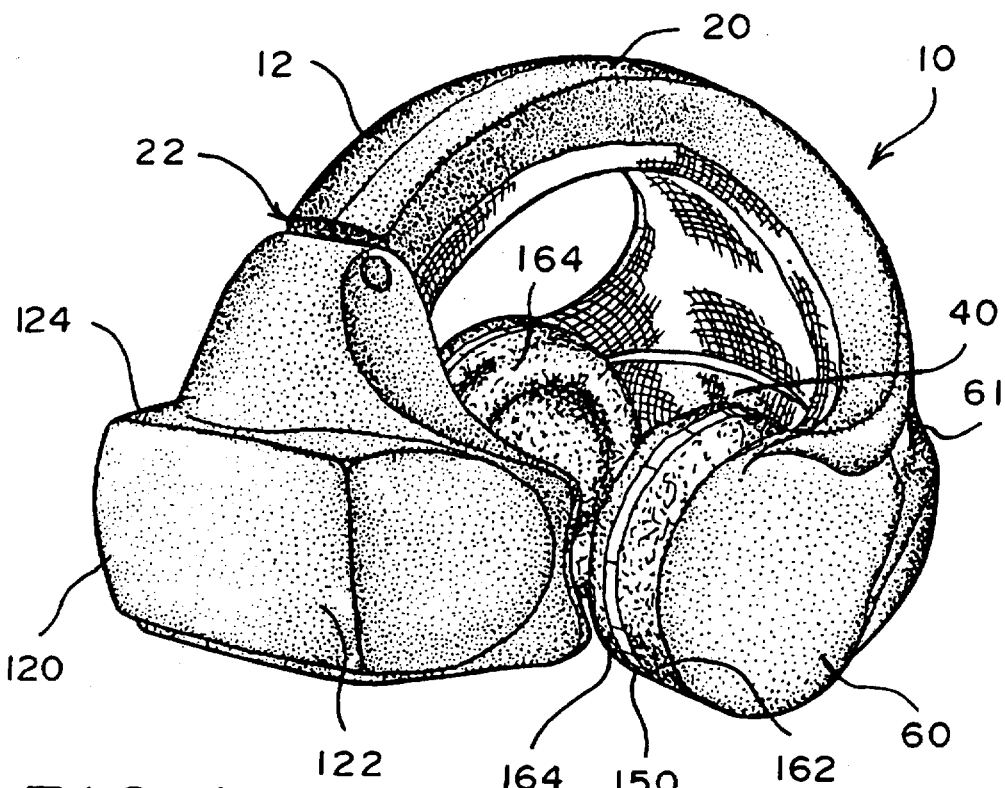
FIG. 1 is a perspective view of the headset with the visor in the operable position.
Figure 2:
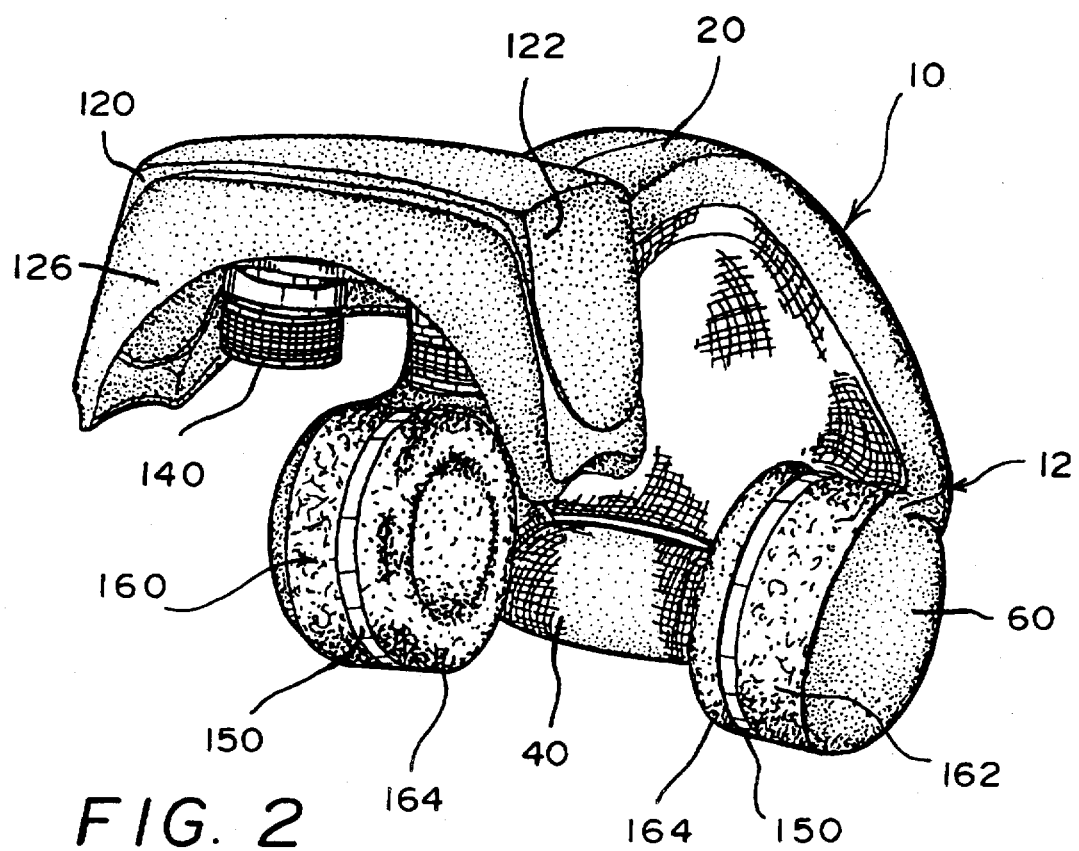
FIG. 2 is a perspective view of the headset in the donning position.
Figure 3:
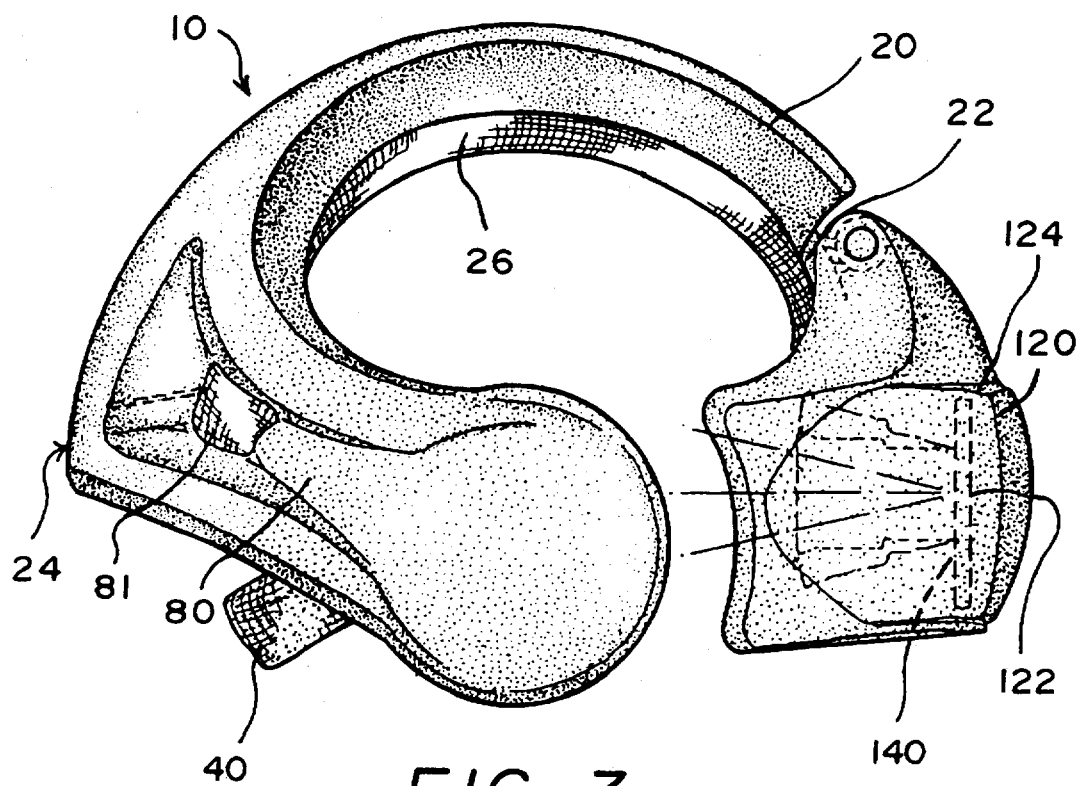
FIG. 3 is a right side elevational view of the headset in the operable position.
Figure 4:
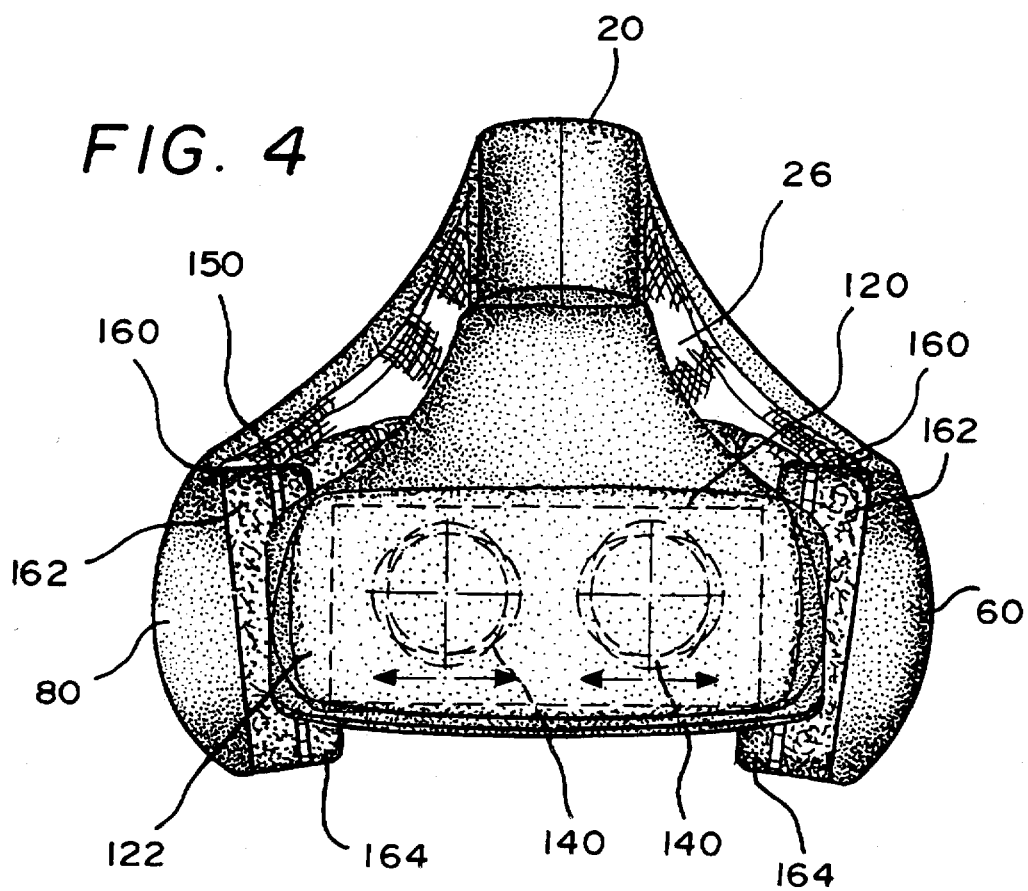
FIG. 4 is a front elevational view of the headset with the visor in the operable position.
Figure 5:
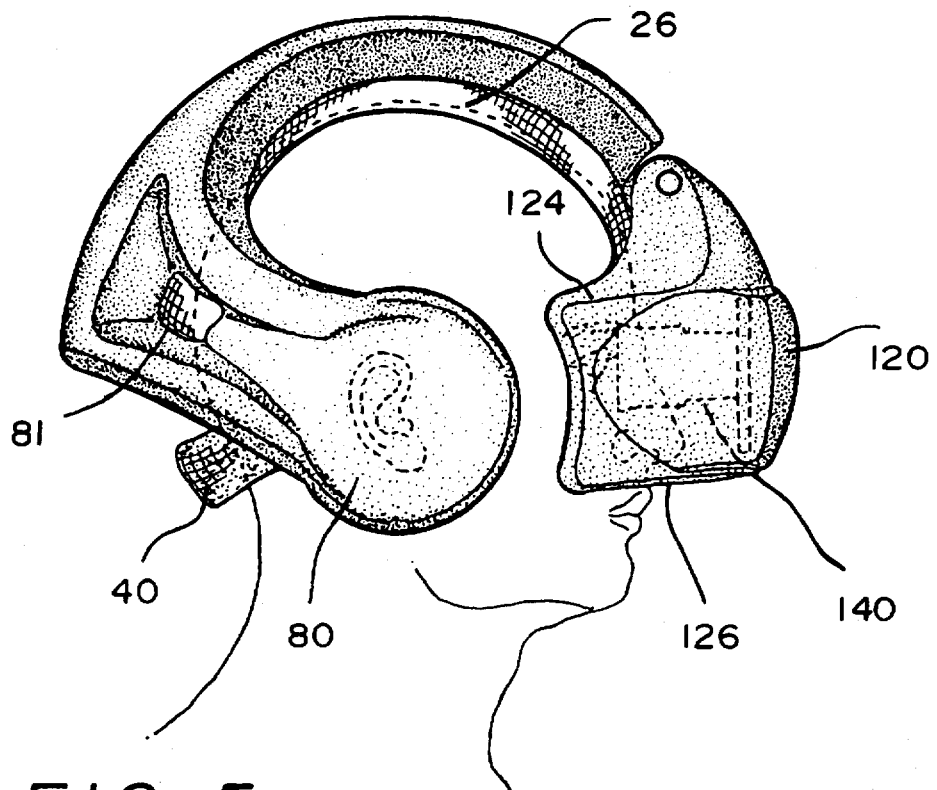
FIG. 5 is a right side elevational view showing the headset operably disposed on the head.
Figure 6:
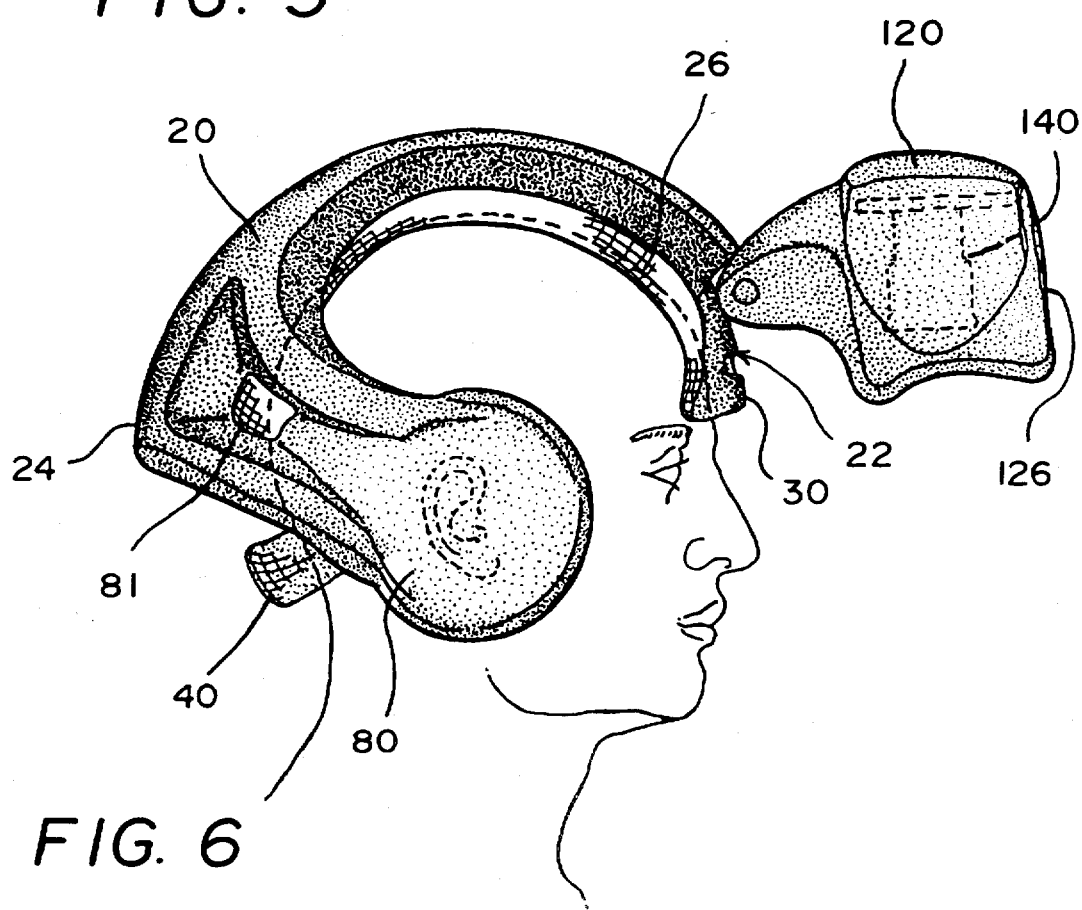
FIG. 6 is a right side elevational view showing the visor in the donning position.

Referring to FIGS. 1–6, the headset 10 of the present invention includes rigid shell 12 having a support beam 20 and a pair of rigid arms 60, 80 extending from the support beam, wherein a visor 120 is pivotally attached to the support beam.

Preferably, the shell 12 is of a one piece construction of a plastic such as ABS or molded polymer. It is understood the shell 12 may be manufactured as a number of individual component parts which are assembled or bonded to form a substantially rigid one piece unit.

Figure 7:
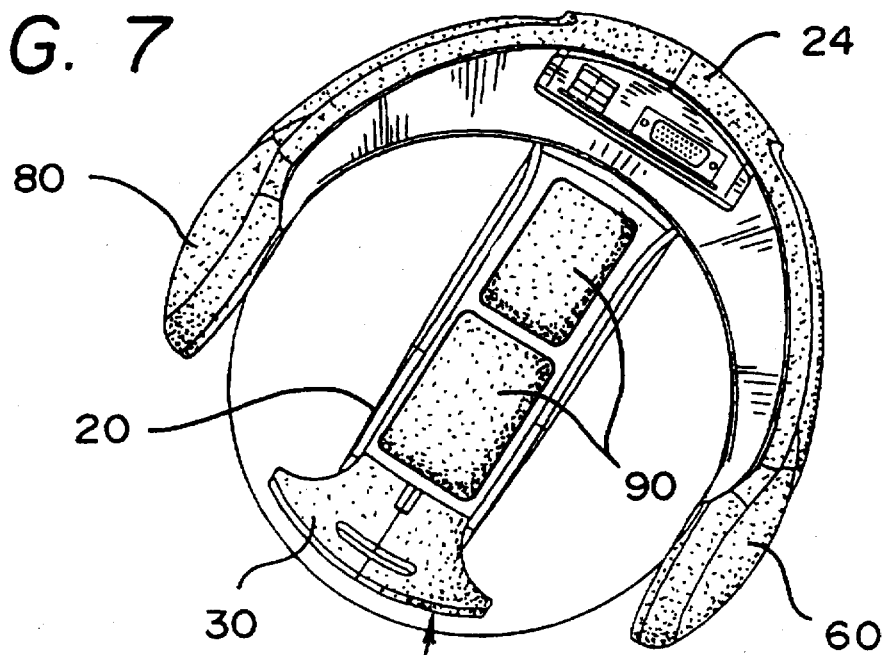
FIG. 7 is a bottom plan view of the shell.
Figure 8:
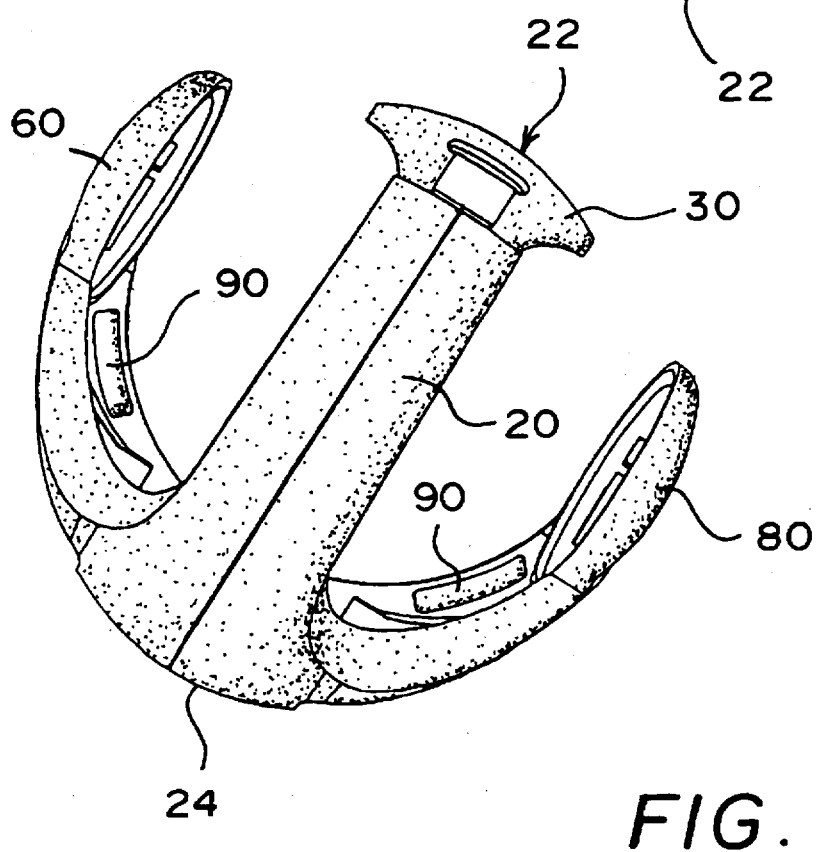
FIG. 8 is a top plan view of the shell.

The support beam 20 extends from an anterior end 22 adjacent the brow over the vertex of the head to terminate at a posterior end 24 adjacent the occiput, or above the articulation of the skull and the spine. It is believed this is adjacent or at the occipital protuberance. The support beam 20 is a rigid piece and may include a single strut or a pair of struts which extend adjacent each side of the vertex of the head. As the support beam 20 acts as a single unit, there are no adjusting mechanisms or articulations in the beam. Referring to FIGS. 1–8, in the single strut configuration, the beam 20 has a width of approximately 2.6 inches. The posterior end 24 of the beam 20 terminates at the occiput above the articulation of the neck and the skull. Specifically, the posterior end 24 terminates adjacent to or above the occipital protuberance. Therefore, the head may be tilted rearwardly (or upwardly) and contact between the beam 20 and the neck or back is substantially precluded.

The anterior end 22 includes a brow piece 30 for contacting the brow of the wearer. As used herein, the brow is defined as the area of the head extending from the supra orbital arch to include the frontal eminence. That is, the area above the eyebrows and below the hair line. The brow piece 30 has a width substantially equal to the inter pupil distance. The brow piece 30 extends from the support beam 20 to the flare to its full width. The brow piece 30 defines an area having a width of approximately four inches, and a height of approximately one inch. This relatively large contact area distributes the contact force over a sufficient area to reduce pressure induced discomfort.

The inside surface of the support beam 20 and brow piece 30, that is, the portion of the shell 12 that contacts the head, may include a foam padding 26. The foam padding 26 may be permanently attached to the beam 20. Alternatively, the padding 26 or portions thereof, may be releasably attached to the beam 20 by hook and loop fastener or other releasable devices.

A rigid arm 60, 80 extends from the posterior end 24 to extend along each side of the head. That is, the arms 60, 80 and the beam 20 are an integral unit free of relative movement or adjustment. The arms 60, 80 extend at a slight incline to accommodate the posterior end 24 of the support beam 20 being adjacent the occipital protuberance and spaced from the neck. That is, the posterior end 24 is slightly above the ears of the wearer. In addition, the junction of the arms 60, 80 and the beam 20 locates a substantial portion of the mass of the headset 10 behind the ears. The arms 60, 80 may include a window or vent 61, 81 respectively to permit ambient air to circulate to a corresponding portion of the head, and extend to terminal ends generally aligned with the ears. The arms 60, 80 define an arcuate contact area around the back of the head defined by a diameter of approximately 7.5 inches. The terminal ends of the arms 60, 80 are sufficiently spaced apart to permit virtually any sized head to be disposed therebetween. The inner surface of the arms 60, 80 which house the speakers are approximately 8.6 inches apart. The shell 12 is sized so that each arm 60, 80 is spaced approximately 1.1 inches from the respective average ear.

A nape strap 40 extends between the arms 60, 80 near their intersection with the posterior end 24 and is located to dispose a portion of the occiput and preferably, the occipital protuberance intermediate the posterior end of the beam 20 and the strap. The nape strap 40 extends between a mount on each arm 60, 80. The mount is intermediate the support beam 20 and the terminal end of the respective arm. The nape strap 40 may pass across the top of the neck or spine or the base of the skull. However, as the nape strap 40 is flexible, movement of the head relative to the spine is not encumbered. Preferably, the nape strap 40 is a flexible padded material and its length may be adjusted by overlapping hook and loop fastener sections.

The visor 120 is pivotally attached to the support beam 20 about a horizontal axis and is movable between the first substantially horizontal donning position and second substantially vertical operable position. Therefore, the weight of the visor 120 and visual display 140 is borne by the support beam 20, and as the support beam is rigid and seats by gravity (rather than constriction of a circumferential contact) pressure points are reduced. The connection point of the visor 120 to the beam 20 is above the brow piece 30, thereby reducing any torque of the headset 10 about the brow piece. Specifically, as the support beam curves 20 rearwardly along the vertex of the head from the brow piece 30, the location of the weight bearing point between the support beam and the visor 120 is substantially vertically aligned with or even slightly rearward of the brow piece 40. That is, a vertical line extending downward from the pivot intersects the brow piece 30. By vertically aligning the weight of the visor 120 at or adjacent the brow piece 30, the tendency of the brow piece to be urged against the brow by the visor is reduced. By precluding the torque, horizontal pressure from the brow piece 30 is minimized. While the visor 120 is shown as movable between a donning position and an operable position, this visor may be fixed in the operable position. Although this complicates donning the headset 10, movement of the visor 120 is not necessary. In the operable position, the visor 120 does not form a weight bearing contact with the face.

The visor 120 includes or may be defined by a visual display 140 for presenting an image to the eyes. The visual display 140 may be any of a variety of displays including but not limited to LCD and projections. A visual display includes 3-D stereoscopic imaging with two full color LCD's with high resolutions and contrast 789 x230 images, wherein the LCD's are 0.7 inch color liquid crystal displays having a 10.6 mm vertical picture size and a 14.3 mm horizontal size. While each eye views different images, both eyes cooperate to provide a field of depth. The visual display 140 may include a single image or a pair of images as shown in the figures. The visual display 140 may be vertically and horizontally displaced relative to each other or the visor 120. The visual display 140 presents substantially the entire field of view to the wearer.

The visor 120 generally conforms to the face in the operable position. That is, the visor 120 extends from in front of the eyes to wrap a sufficient distance around the head to terminate behind the eyes. The visor 120 includes a front surface 122 which extends about the face to terminate behind the eyes. The visor 120 includes an upper deck 124 sized to be adjacent the brow, thereby seating about the brow piece 30 and subsequently precluding ambient light from above contacting the eyes, without forming a weight bearing contact with the wearer. The visor 120 also includes a lower deck 126 sized so that upon operable orientation of the visor, the lower deck is sufficiently spaced from the wearer to permit vision with the ambient environment. The lower deck 126 terminates adjacent the nose in the operable position of the visor 120.

The visor 120 may house the visual display 140 for motion between the donning and the operable position, or may be substantially integrated into the visual display so that the components are inseparable. That is, the visual display 140 may be configured such that only the visual display is suspended from the brow piece 30, rather than within a visor 120. The visual display 140 then functions as the visor 120 with respect to shielding from the ambient light environment.

Speakers 150 are located in the terminal ends of the arms 60, 80 to be adjacent the respective ears. Preferably, the speakers 150 are high quality stereo speakers which may utilize signals from any standard stereo sound card. Each speakers 150 cooperates with a compensator 160. The compensator 160 is a resilient, deformable member which acts as a spring to urge respective contact with the head.

The compensator 160 includes an open cell foam base 162 enclosed in a fabric or plastic cover, the speaker 150 is seated in the base 162 and a contact ring 164 attached to dispose the speaker intermediate of the contact ring and the arm. The contact ring 164 is also a resiliently compressible foam member which may be permanently or removably attached. Removable attachment includes releasable adhesives, hook and loop fasteners or mechanical friction fits.

In the compensator 160, the foam base 162 and covering form a bellows which vents air during compression. The venting of the air through limited ports allows the compensator 160 to initially substantially resist a compressive force while yielding over the span of a few seconds. The compensators 160 presented to the ears of the user are formed of an open cell foam covered with cloth to form the bellows, and have a thickness of approximately 1.5 inches, with a diameter of approximately 4¼ inches. Therefore, the combined thickness of the cushioning presented to the ears is approximately 3 inches. The thickness of the compensator 160 allows the rigid fixed arms to accommodate a wide variety head sizes.

Specifically, the sizing of the shell 12 and compensators 160 is selected to accommodate approximately 95% of the population within the rigid, fixed shell. The head dimensions and percentile of the encompassed population is shown.

| Percentile | Width | Length | Depth |
|---|---|---|---|
| Adult Male | | | |
| 2.5% | 5.71 | 6.81 | 8.50 |
| 5.0% | 5.77 | 6.87 | 8.20 |
| 50% | 6.10 | 7.20 | 8.70 |
| 95% | 6.43 | 7.63 | 9.20 |
| 97.5% | 6.50 | 7.71 | 9.29 |
| Adult Female | | | |
| 2.5% | 5.31 | 6.30 | 6.69 |
| 5.0% | 5.38 | 6.38 | 6.81 |
| 50% | 5.71 | 6.81 | 7.28 |
| 95% | 6.10 | 7.14 | 7.72 |
| 97.5% | 6.18 | 7.20 | 7.72 |
| Male Child | | | |
| 2.5% | 5.39 | 7.13 | 7.01 |
| 5.0% | 5.39 | 7.13 | 7.01 |
| 50% | 5.67 | 7.64 | 7.36 |
| 95% | 5.94 | 8.23 | 7.72 |
| 97.5% | 5.94 | 8.23 | 7.72 | where depth is the vertical distance from the chin to the top of the head width is the horizontal distance between the ears; and length is the horizontal distance from the nasal cartilage to the back of the head.

As the distance between the portions of arms 60, 80 that house the compensators 160 is approximately 8.6 inches, the total of 3 inches of compensator thickness allows the head to accommodate head sizes down a width of less than six inches.

The compensators 160 contact an area of the head that is greater than the area of the ears. Specifically, the contact ring 164 encircles the ear, rather than pressing the ear against the head. The increased contact area again distributes the contact force over a large area. In addition, the compensators 160 are partially compressed upon the headset being disposed on the head, such that further compression is sufficiently resisted so as to transfer slue (torque) from the head to the headset without a significant delay. The compensators thereby assist in coupling the headset 10 to the head.

The inside of the shell 12 may include selectively inflatable bladders 90 for sizing the headset 10 to the individual head and coupling the headset to the head. Specifically, the compensator 160, padding 26 on the support beam 20 and brow piece 30 may include independently or commonly controlled bladders 90. The bladders may be filled pressurized or ambient air by the user. Alternatively, the bladders may be fluidly interconnected so that donning the headset redistributes the fluid between the bladders 90.

The thickness and walls of the shell 12 are formed such that upon inclusion of the visual display 140, speakers 150 and associated wiring and connectors, the center of gravity of the headset 10 lies on a line extending substantially between the speakers (the ears of the user). The weight of the headset 10 is balanced between the anterior end 22 and the posterior end 24 of the support beam 20. In addition, the shell 12 and hardware are symmetrically balanced so that the left side and the right side are of substantially equal mass and the center of gravity is equally spaced between the arms 60, 80. Preferably, the hardware is integrated into the shell 12 such that the shell alone has a center of gravity lying on a line between the terminal ends of the arms 60, 80. However, it is understood the shell 12 may be formed to accommodate different loading patterns of the hardware.

The amount of material in the shell 12 adjacent the posterior end 24 and the junction of the arms 60, 80 to the support beam 20 creates a sufficient mass such that upon orientation of the visor 120 (and visual display 140) in the horizontal donning position, the headset 10 does not rotate about the head.

The headset 10 includes standard input connectors for receiving visual and audio signals from a computer or other processor units.

Operation

The headset 10 is disposed over the head so that the brow piece 40 contacts the brow and the posterior end 24 of the beam 20 is at the occiput adjacent the occipital protuberance. The nape strap 40 extends across the joint of the neck and the skull. Upon selective adjustment of the nape strap 40, the distance between the brow piece 40 and the nape strap is varied thereby accommodating different size heads.

In the donning position, the visor 120 is tilted to be horizontal. The headset 10 may be placed on the head and removed from the head. The user has an unobstructed forward view. The weight of the headset 10 is distributed along the support beam 20. The visor 120 may be rotated downward to the operable position locating the visual display 140 before the eyes. As the visor 120 and visual display 140 are pivoted from the support beam 20, they are suspended in the operable position which disposes the visual display before the eyes. As there is no weight bearing contact between the visor 120/visual display 140 and the face (including the nose and cheeks) the weight distribution remains along the support beam 20 and is independent of the position of the visor. In the operable position, the lower deck 126 of the visor 120 is spaced from the face by a sufficient distance so that the user can cast the eyes downward away from the visual display 140, and immediately view the external or ambient environment. That is, the visor 120 is configured to preclude substantially enclosing the users eyes. While the upper deck 124 may contact the brow, it is not a weight bearing contact.

The compensators 160 are each compressed to provide a snug fit against the side of the head. In addition, as the compensators 160 are oversized to enclose the ear and the surrounding portion of the head, the pressure is distributed over a larger area, rather than just the ear. The compensators 160 are sufficiently compressed and offer sufficient resiliency so that upon rotation of the head about any axis, or combination of axes, the slue rate of the head is transferred to the rigid shell 12.

That is, the compensator 160, brow piece 30 and nape strap 40 sufficiently couple the headset 10 to the head such that a slue rate of the head is sufficiently transferred to the shell 12 so that motion of the shell may be monitored to provide a signal corresponding to the motion of the head. The coupling between the headset 10 and head is augmented by the bladders 90 located on the inside of the shell 12.

The contact between the headset 10 and the head through the rigid arms 60, 80 compensators 160 and posterior end 24 of the support beam 20 primarily couples the headset 10 to the head as the head may be rotated in a horizontal plane left and right.

As the posterior end 24 is arcuate and the brow piece 30 extends across a relatively large width of the brow, the support beam 20 not only couples the headset 10 to the head in forward and rearward motion, but also assists in coupling as the head turns left and right as well as side to side.

The combination of the generally U-shaped contact between the head and (a) the support beam 20 (the closed end of the U extending along the vertex) and (b) the U-shaped contact of the arms 60, 80 and the posterior end 24 of support beam 20 (the closed end of the U being slightly inclined but generally horizontal and extending around the occiput of the head) sufficiently couples the headset 10 to the head so that monitoring motion of the headset accurately reflects in real time corresponding motion of the head. That is, the arms 60, 80 form a second substantially U-shaped engagement of the head and the support beam 20 forms a first substantially U-shaped engagement with the head, wherein the second U shaped engagement is rotated 90° about two axes from that of the beam.

The reduced weight of the headset 10, adjustment of the nape strap 40 and the compression of the compensators 160 sufficiently couple the headset 10 to the head so that upon a slue rate imparted in the head, the headset experiences a substantially equal slue rate. Without the optics and speaker hardware, the present headset 10 has a weight of approximately 1.2 lbs. [20 oz. (580 g).]

The combination of the nape strap 40, brow piece 30 and compensators 160 allows the shell 12 to be a rigid one piece construction, free of any adjusting mechanism. The non adjustable shell 12 reduces the number of moving parts and permits a durable construction. Further, the use of a rigid vertex oriented support beam 20 and the arcuate segment formed by the arms 60, 80 allows the headset 10 to operably engage the head without requiring circumferential contact or circumferential construction.

In addition, the present headset 10 may be employed with programs which interact with the orientation of the head. Therefore, a virtual orientation system (a sourceless tracking device that monitors movement of roll, pitch and yaw) may be included in the headset in the posterior end of the beam.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A headset for engaging a head of a wearer, comprising:
   (a) a rigid support beam curved to fit the head between an anterior end having a brow piece for contacting a brow of the head and a posterior end
   (b) a first speaker;
   (c) a rigid left arm extending from the posterior end to extend anteriorly and along a left side of the head to locate the first speaker adjacent a left ear of the wearer;
   (d) a second speaker;
   (e) a rigid right arm extending from the posterior end to extend anteriorly and along a right side of the head to locate the second speaker adjacent a right ear of the wearer; and
   (f) a visual display attached to the support beam such that in an operable position the visual display is suspended from the support beam to preclude weight bearing contact between the visual display and the wearer.

2. The headset of claim 1, wherein the visual display is movable between an operable position adjacent the eyes and a donning position spaced apart from the eyes.

3. The headset of claim 1, further comprising:
   (a) a left mount on the left arm and a right mount on the right arm; and
   (b) a nap strap extending between the spaced mounts to locate a portion of the occiput intermediate the nape strap and the posterior end and to selectively vary the distance between the brow piece and the nap strap in a non-circumferential contact with the head.

4. The headset of claim 1, wherein the left arm, the right arm and the support beam are sized to engage a portion of the head between the arms such that upon a given slue rate of the head a directly proportional slue rate is imparted to the headset.

5. The headset of claim 1, further comprising:
   (a) an inflatable bladder connected to one of the right arm, the left arm and the beam to couple the headset to the head.

6. A headset for locating an eyepiece adjacent to a wearer's eyes, comprising:
   (a) a head beam extending along the head from a brow piece to a posterior end, the brow piece sized to contact the brow and the posterior end sized to prevent the headset from bearing on the neck; and
   (b) a pair of rigid arms extending anteriorly from the posterior end to contact the sides of the head and locate a headset center of gravity along a line extending between the arms.

7. A headset for engaging a head of a wearer, comprising:
   (a) a support beam curved to fit the head between a brow of the head and a posterior portion of the head, the support beam including a brow piece for contacting the brow;
   (b) a rigid arm connected to the support beam adjacent the posterior portion of the head to extend toward an anterior portion of the head; and
   (c) a visor attached to the support beam and disposable in an operable position;
   the support beam and visor selected so that upon orientation of the visor in the operable position, the visor is suspended from the support beam to preclude weight bearing contact between the visor and the head.

8. The headset of claim 7, wherein the support beam, brow piece and arm are sized to couple the headset to the head to accurately translate a slue rate of the head to the headset.

9. The headset of claim 7, wherein the visor includes a visual display and is movable between a donning position and the operable position.

10. The headset of claim 7, wherein the support beam is sized to extend along the vertex of the head.

11. A headset for engaging a head of a wearer, comprising:
    (a) a curved support beam for contacting the head between a brow piece for contacting the brow and a posterior end the posterior end including a pair of spaced apart mounts; and
    (b) a nape strap extending between the mounts for contacting the wearer below the occipital protuberance and selectively varying the distance between the brow piece and the nape strap.

12. A headset for releasably engaging a head, comprising:
    (a) visual display for providing a field of vision; and
    (b) a brow piece contacting a brow of the head to operably suspend the visual display and preclude weight beating contact between the visual display and the head.

13. The headset of claim 12, further comprising
    (a) a support beam connected to the brow piece for contacting the head.

14. The headset of claim 13, further comprising:
(a) a visor connected to the support beam and positioned to be suspended from the support beam in a non weight bearing contact with the head.

15. The headset of claim 13, further comprising:
(a) spaced apart mounts on the support beam; and
(b) a nape strap extending between the spaced apart mounts.

16. The headset of claim 13, further comprising:
(a) sound reproducing means carried by the support beam.

* * * * *